(12) United States Patent (10) Patent No.: US 8,756,159 B1
Gibson et al. (45) Date of Patent: Jun. 17, 2014

(54) METHOD OF ARCHIVE RETRIEVAL OF CHECK INFORMATION BASED ON LOCATION

(71) Applicant: Bank of America Corporation, Charlotte, NC (US)

(72) Inventors: Lisa Gibson, Newnan, GA (US); Geoffrey Reed Williams, Midlothian, TX (US); Craig David Palmer, Mint Hill, NC (US); Eric Scott Sandoz, Concord, CA (US); Michael Gerald Smith, Fort Mill, SC (US); Melvin Gregory Nixon, Lake Wylie, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/768,198

(22) Filed: Feb. 15, 2013

(51) Int. Cl.
*G06Q 40/00* (2012.01)

(52) U.S. Cl.
USPC .............................................. 705/45; 705/35

(58) Field of Classification Search
USPC .................................................... 705/35, 45
See application file for complete search history.

(56) References Cited

U.S. PATENT DOCUMENTS

| | | | |
|---|---|---|---|
| 7,386,485 B1* | 6/2008 | Mussman et al. | 705/14.1 |
| 2004/0010462 A1* | 1/2004 | Moon et al. | 705/39 |
| 2005/0040230 A1* | 2/2005 | Swartz et al. | 235/383 |
| 2009/0112662 A1* | 4/2009 | Mullen et al. | 705/7 |
| 2011/0321127 A1* | 12/2011 | Pitroda et al. | 726/3 |
| 2013/0275222 A1* | 10/2013 | Amaro et al. | 705/14.58 |

OTHER PUBLICATIONS

Featherman, M. S. (2002). Evaluative criteria and user acceptance of internet-based financial transaction processing systems. (Order No. 3045420, University of Hawai'i). ProQuest Dissertations and Theses, 557-557 p. Retrieved from http://search.proqest.com/docview/305588799?accountid=14753. (305588799).*

Lu, M. (2010). Efficient metadata update techniques for storage systems. (Order No. 3422839, State University of New York at Stony Brook). ProQuest Dissertations and Theses, , 199. Retrieved from http://search.proquest.com/docview/757873045?accountid=14753. (757873045).*

Miley, P. K. (2001). Perceived risk for shopping via the internet among united states consumers. (Order No. 3012870, Texas Woman's University). ProQuest Dissertations and Theses, , 323-323 p. Retrieved from http://search.proquest.com/docview/304768205?accountid=14753. (304768205).*

* cited by examiner

*Primary Examiner* — Muriel Tinkler
(74) *Attorney, Agent, or Firm* — Michael A. Springs; Moore & Van Allen, PLLC; Andrew D. Gerschutz

(57) ABSTRACT

Embodiments of the invention include systems, methods, and computer-program products that provide for a system to receive information related to check transaction based on the location of the user. In one embodiment of the invention, the computer-implemented method determines a location of a check transaction and stores the location in an archive in association with the check transaction. The method then determines a location of a user and determines a list of check transactions associated with the location of the user. In some embodiments, the method provides the list of check transactions to the user. The method may also provide offers or recommendations to the user, such as an offer to establish a direct transfer instead of using a check in the future. The user and/or the provider of the method may also broaden or narrow the search results based on characteristics of the transaction.

18 Claims, 7 Drawing Sheets

METHOD OF ARCHIVE RETRIEVAL OF CHECK INFORMATION BASED ON LOCATION

BACKGROUND

People continue to write checks to make purchases, transfer funds, or for other reasons. A check includes extensive information related to the transaction, which may include the account number, an amount, and a recipient. In some situations, a check also includes location information, such as an address printed on the check. Checks are useful for paying for products or services and producing a hard copy record of the transaction. Given the benefits of checks, consumers still continue to use checks to make purchases.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

In an aspect, a system for retrieving check information based on location is provided. In some embodiments, the system includes a computer apparatus including a processor and a memory; and a software module stored in the memory, comprising executable instructions that when executed by the processor cause the processor to perform a series of actions. The series of actions may include determining a location of a check transaction; storing the location in an archive in association with the check transaction; determining a location of a user; determining a list of check transactions associated with the location of the user; and providing the list of check transactions to the user.

In some embodiments, the system is further configured to provide an offer to the user based at least in part on a check transaction at the location of the user. For example, the offer may be an offer to establish an alternative payment method for the check transaction. The offer may also be an offer for a benefit when the user uses an alternative payment method for the check transaction. In some embodiments, the system includes determining at least one limitation on the list of transactions, wherein the limitation is based on a characteristic of the transaction selected from the group consisting of a location, an amount, a date, and a category. In an embodiment, the location of the user is determined using a positioning system device. In a still further embodiment, storing the location in the archive with the check transaction includes extracting check information from the check and storing the check information in a database. The location of the check transaction may be determined based on an address of the recipient of the check.

In a further aspect, a computer program product retrieving check information based on location is provided. In some embodiments, the computer program product includes a non-transitory computer readable storage medium having computer readable program code embodied therewith, the computer readable program code comprising: a computer readable program code configured to determine a location of a check transaction; a computer readable program code configured to store the location in an archive in association with the check transaction; a computer readable program code configured to determine a location of a user; a computer readable program code configured to determine a list of check transactions associated with the location of the user; and a computer readable program code configured to provide the list of check transactions to the user.

In some embodiments, the computer program product further includes a computer readable program code configured to provide an offer to the user based at least in part on a check transaction at the location of the user. The offer may be an offer to establish an alternative payment method for the check transaction or an offer for a benefit when the user uses an alternative payment method for the check transaction. In some embodiments, the computer program product further includes computer readable program code configured to determine at least one limitation on the list of transactions, wherein the limitation is based on a characteristic of the transaction selected from the group consisting of a location, an amount, a date, and a category. In further embodiments, the location of the user is determined using a positioning system device. In still further embodiments, storing the location in the archive with the check transaction comprises extracting check information from the check and storing the check information in a database. The location of the check transaction may be determined based on an address of the recipient of the check.

In a still further aspect, a method for retrieving check information based on location is provided. In some embodiments, the method includes using a computer processor comprising computer program code instructions stored in a non-transitory computer readable medium, wherein said computer program code instructions are structured to cause said computer processor to: determine a location of a check transaction; store the location in an archive in association with the check transaction; determine a location of a user; determine a list of check transactions associated with the location of the user; and provide the list of check transactions to the user.

In an embodiment, method further includes providing an offer to the user based at least in part on a check transaction at the location of the user. The offer may be an offer to establish an alternative payment method for the check transaction or an offer for a benefit when the user uses an alternative payment method for the check transaction. In still further embodiments, the method further includes determining at least one limitation on the list of transactions, wherein the limitation is based on a characteristic of the transaction selected from the group consisting of a location, an amount, a date, and a category.

Other aspects and features, as recited by the claims, will become apparent to those skilled in the art upon review of the following non-limited detailed description of the invention in conjunction with the accompanying figures.

BRIEF DESCRIPTION OF THE DRAWINGS

Figure 1:
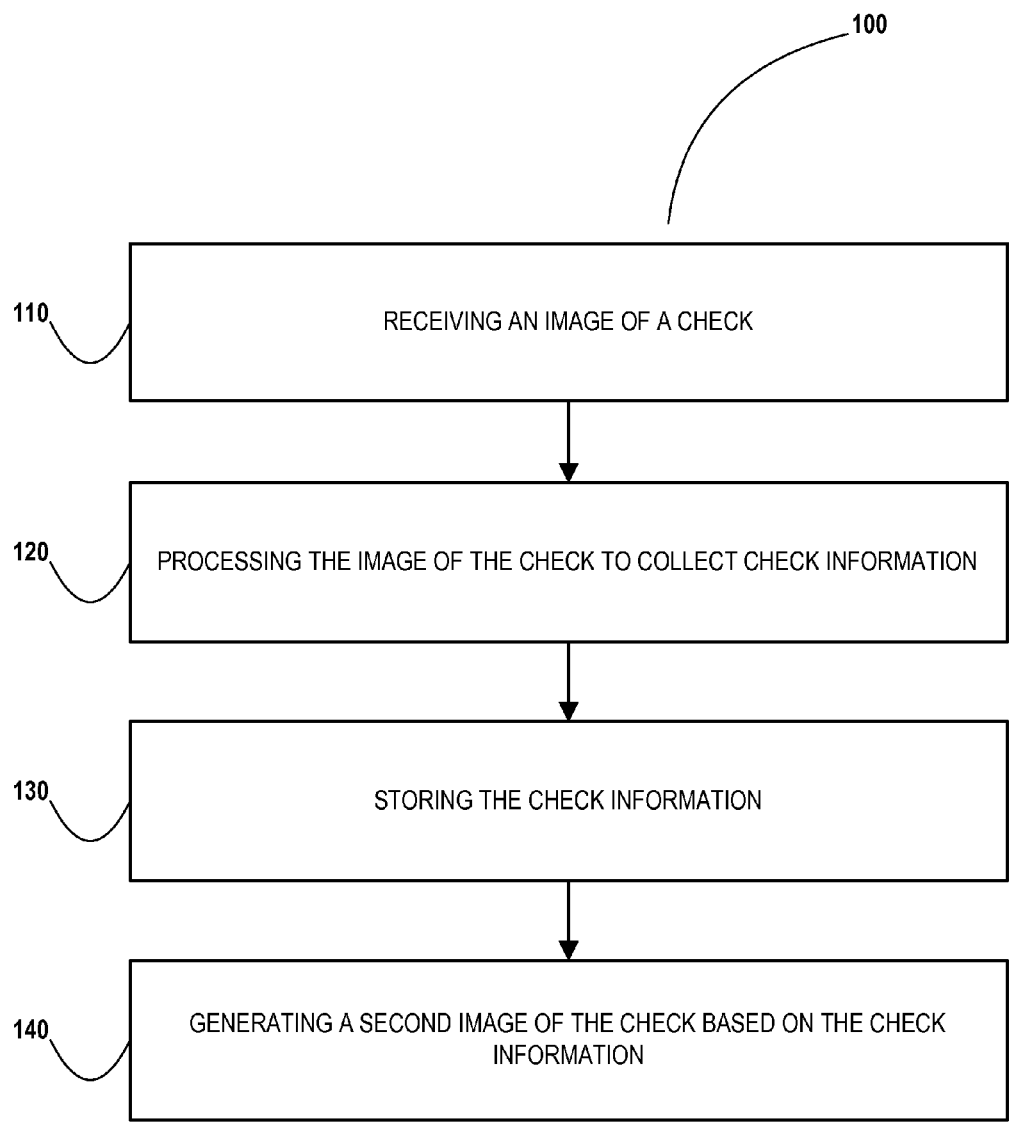
Figure 2:
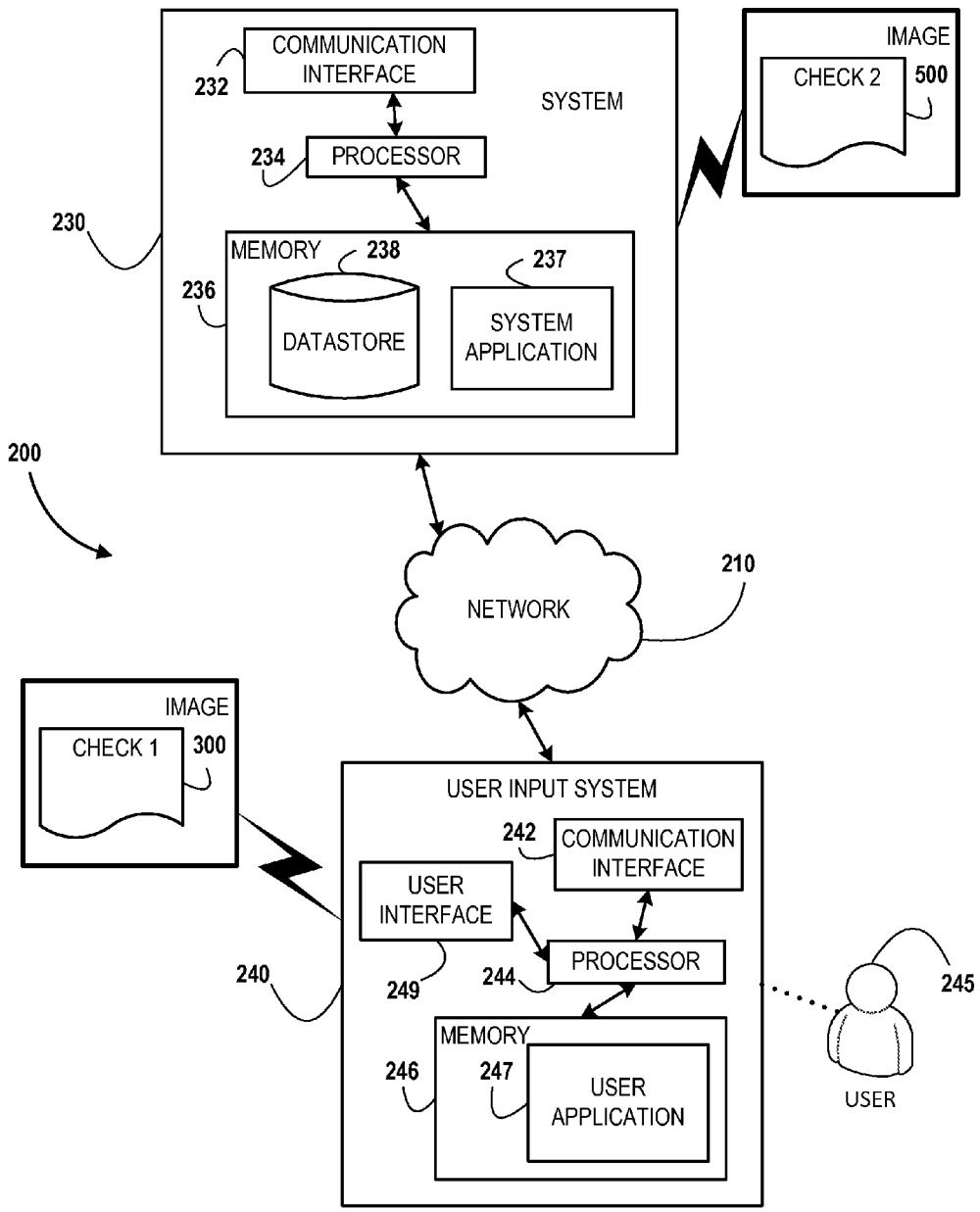
Figure 3:
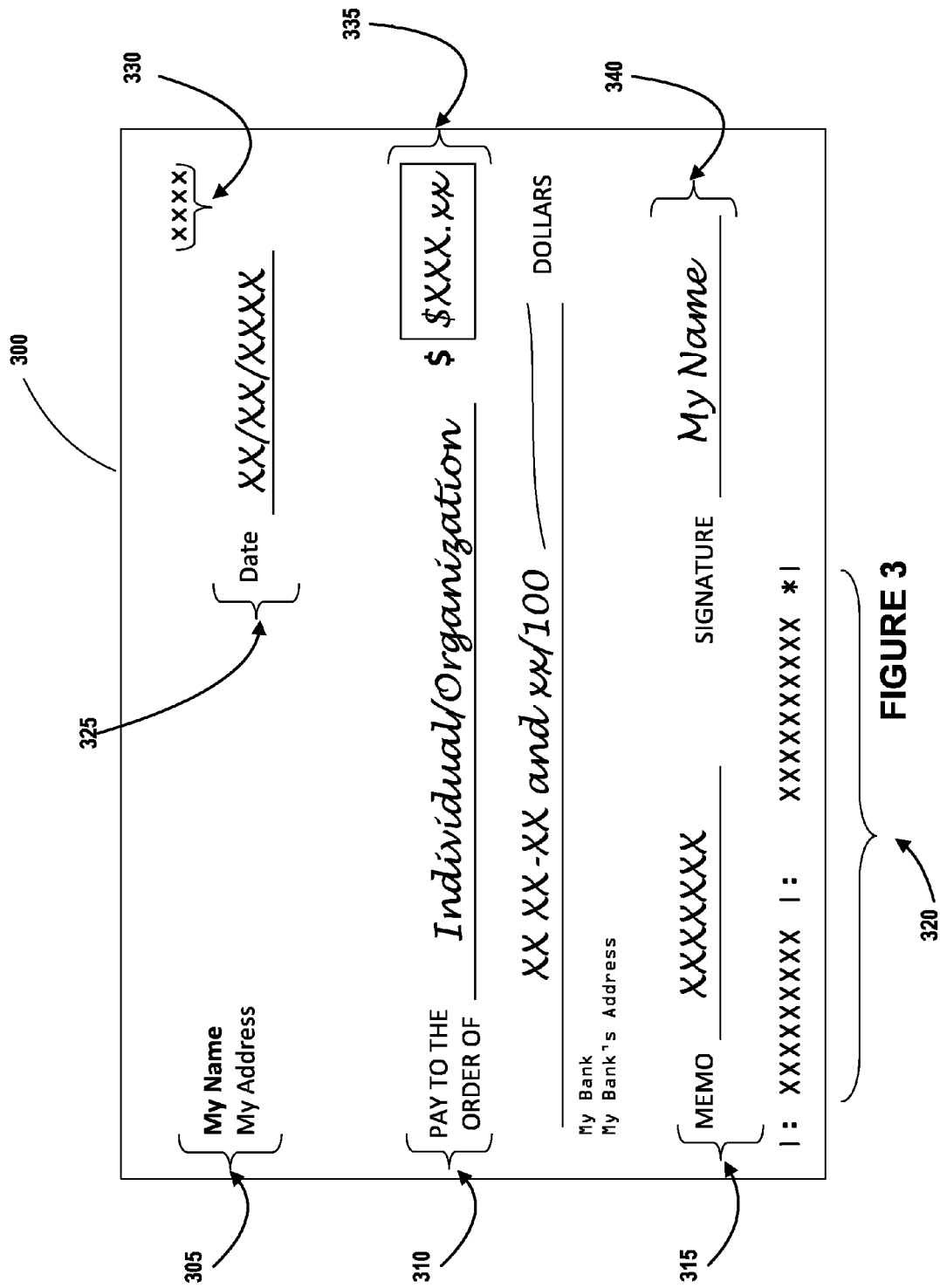
Figure 4:
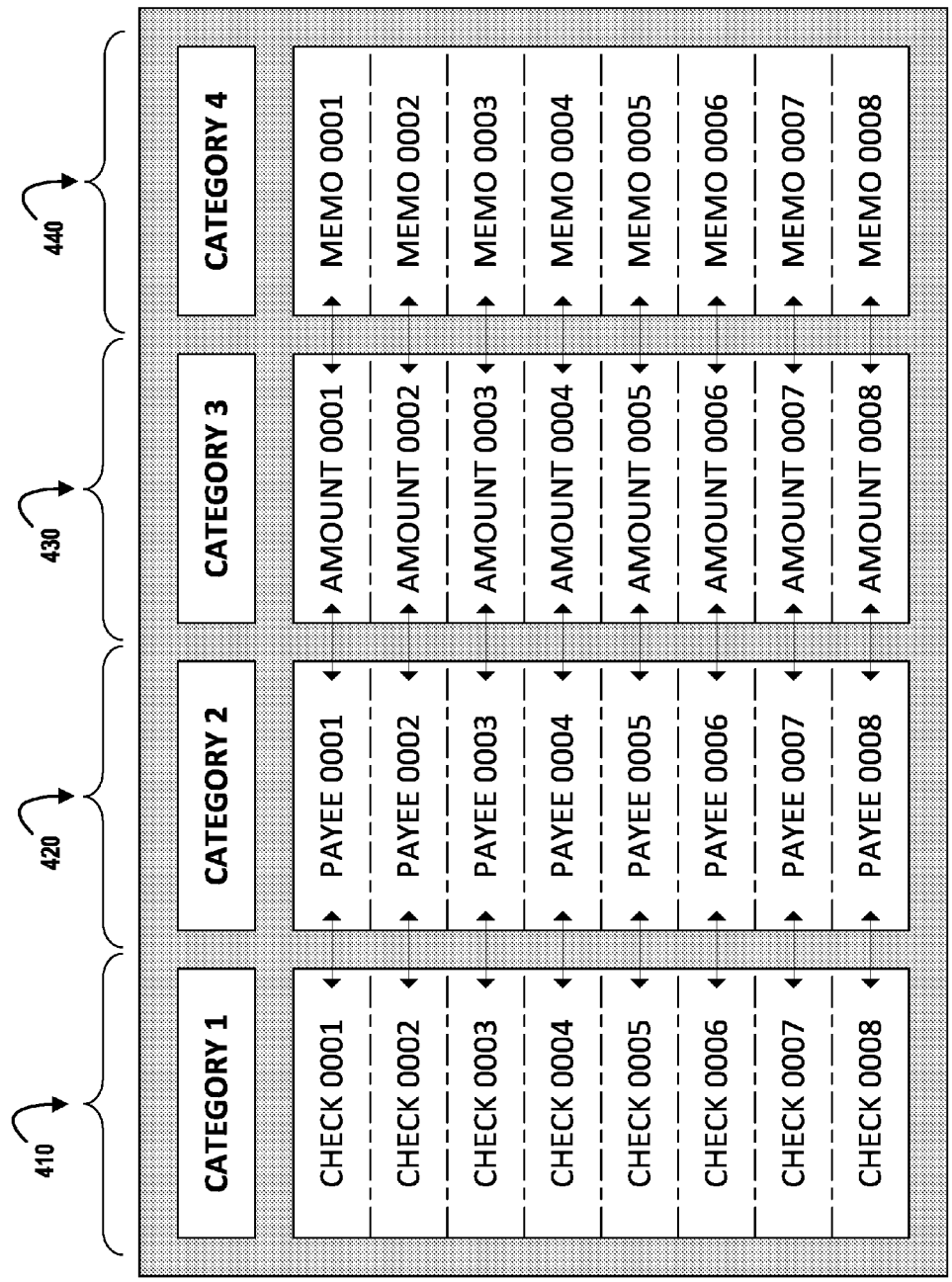
Figure 5:
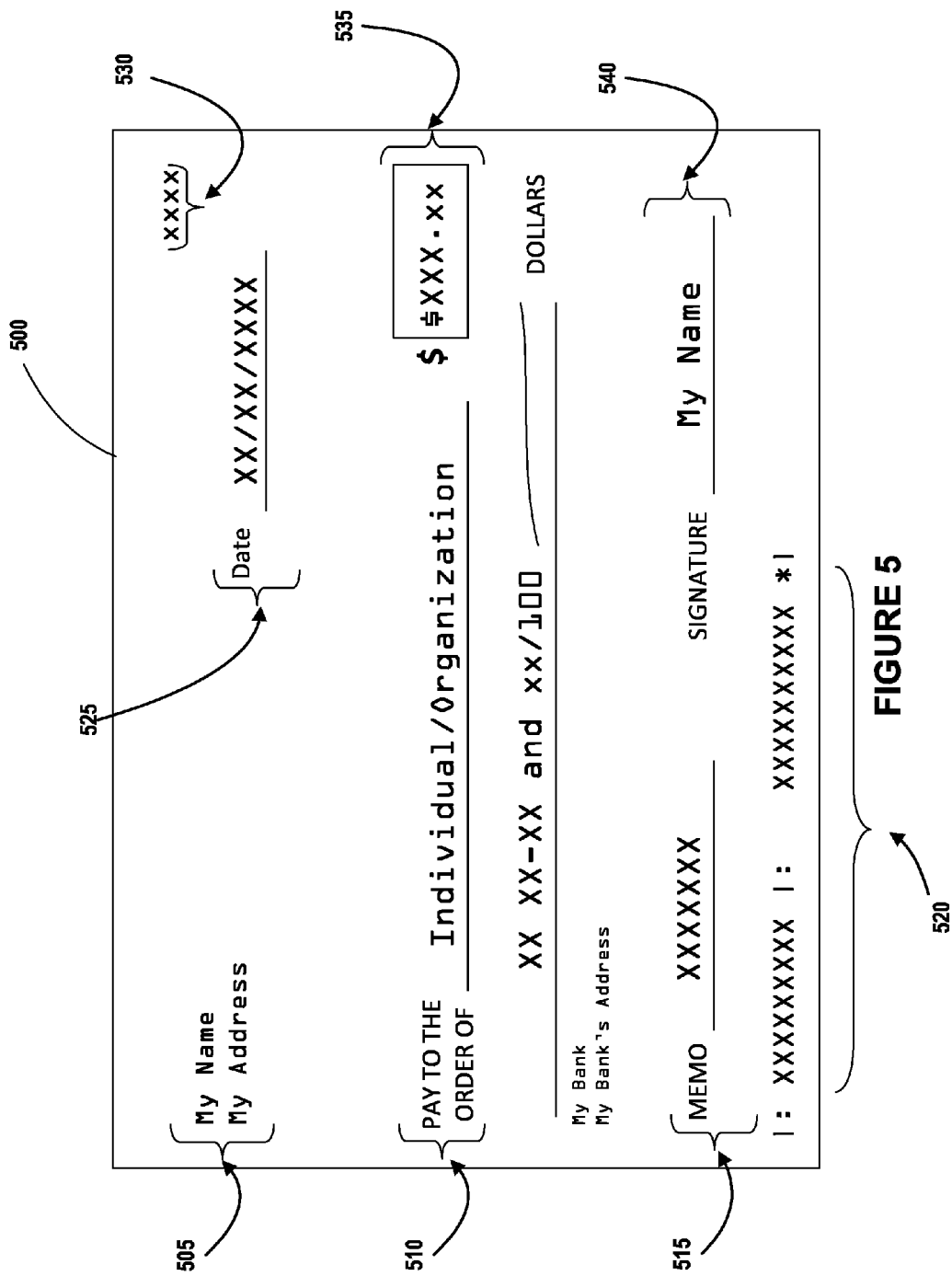
Figure 6:
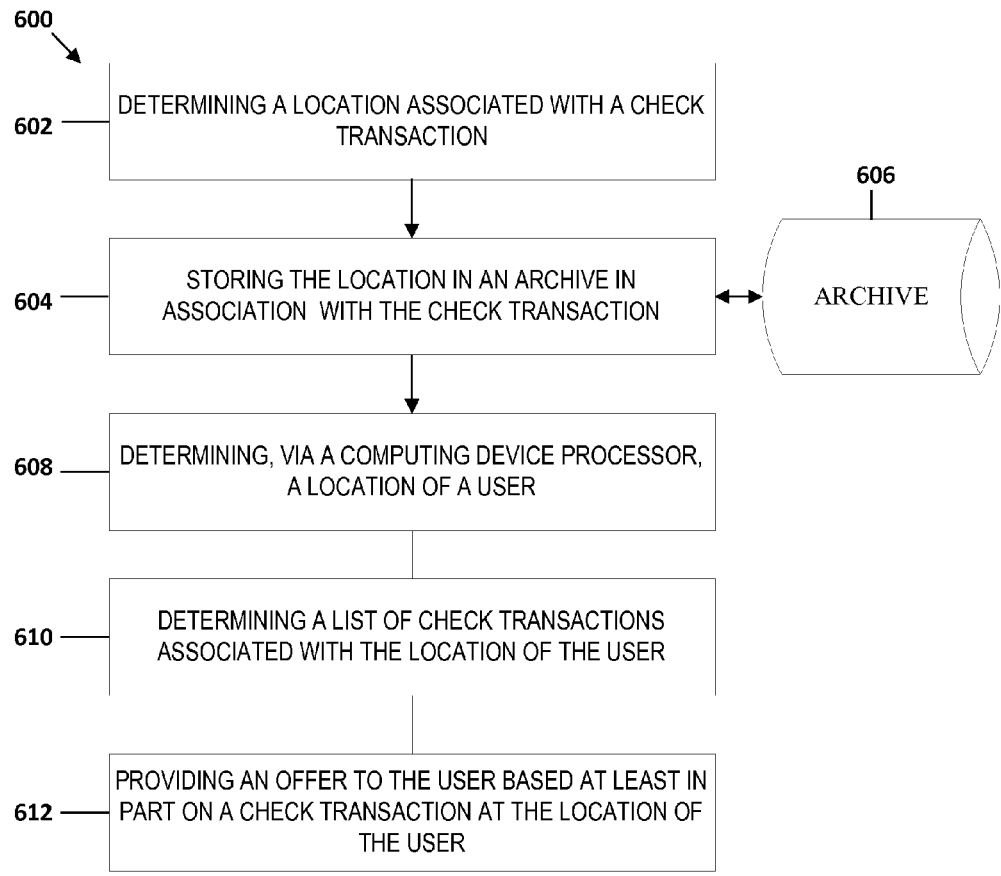
Figure 7:
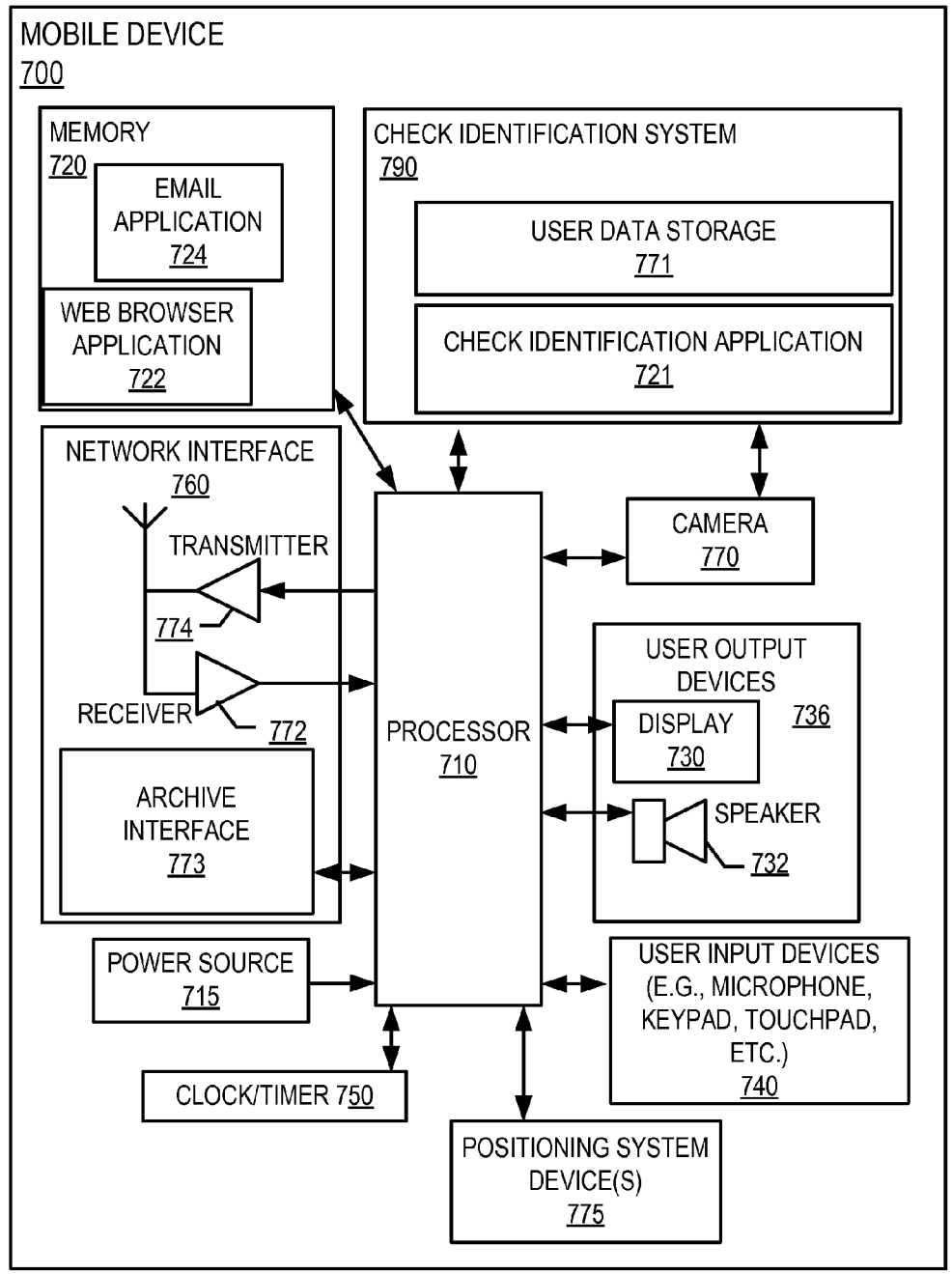

Having thus described embodiments of the invention in general terms, reference will now be made to the accompanying drawings, wherein:

FIG. 1 is a flowchart illustrating a general process flow for the complete system of receiving, processing, storing, and generating an image of a check, in accordance with embodiments of the present invention;

FIG. 2 is a block diagram illustrating technical components of a system for storing an image of a check, enabling access to an image of a check, and processing at least one request to retrieve an image of a first check and a second check, in accordance with embodiments of the present invention;

FIG. 3 illustrates an exemplary image of the check that is to be retrieved by the user input system and processed by the system from which check information is collected, in accordance with embodiments of the present invention;

FIG. 4 illustrates an exemplary datastore for storing the check information, in accordance with the embodiments of the present invention;

FIG. 5 illustrates an exemplary image of the check that is to be generated by the system based on the stored check information, in accordance with the embodiments of the present invention;

FIG. 6 is a flow chart of a method of retrieving check information from an archive based on location, in accordance with some embodiments of the invention; and FIG. 7 is a block diagram of an exemplary mobile device, in accordance with some embodiments of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

In some embodiments, a system and method is provided that includes determining a location of a check transaction; storing the location in an archive in association with the check transaction; determining a location of a user; determining a list of check transactions associated with the location of the user; and providing the list of check transactions to the user, as will be discussed in greater detail below. The method may also include providing offers or recommendations to the user based at least in part on the check transaction. In some embodiments, the method allows the user or the system to broaden or narrow the search results based on at least on characteristic of the transaction. The system and method allows users to quickly identify previous transactions at their current location and, if desired, receive offers related to the transactions.

Unless specifically limited by the context, a "check transaction" refers to any communication between the user and the financial institution or other entity. In some embodiments, for example, a check transaction may refer to a purchase of goods or services, a transfer of funds, a payment transaction, a credit transaction, or other interaction involving a check. As used herein, a "bank account" refers to a credit account, a debit/deposit account, or the like. Although the phrase "bank account" includes the term "bank," the account need not be maintained by a bank and may, instead, be maintained by other financial institutions. In some embodiments, a check transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, the check transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective, or both. In some embodiments, the point-of-transaction device refers only to a user's device, in other embodiments it refers only to a merchant device, and in yet other embodiments, it refers to both a user device and a merchant device interacting to perform a transaction.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), and/or various combinations of the foregoing.

The disclosure further discusses determination of a user's location. As discussed, user location can be determined by interaction of the user with a point-of-transaction device as discussed above. Location of the user could also be determined based on output from accelerometers, gyroscopes, earth magnetic field sensors, air-pressure sensors (altitude), etc.

The present invention discloses a check imaging technology with a purpose of saving storage space in the archive of an entity (e.g., a financial institution). Currently, an entity's check imaging system may receive an image of a check at a high resolution (200 dots per inch (DPI)) and may store the image in the archive at this resolution for a mandated period of seven years. However, regulations may not require that the archived image be of this high resolution. To save storage space in the archive, the present invention may capture pieces of the check information by processing the image of the check and then store the various pieces of the check information as either text or smaller high resolution (or low resolution) images. The pieces of check information may then be retrieved individually or in bulk by an apparatus to generate a second image of the check. Furthermore, the present invention may create a thumbnail version of the image of the check at a lower resolution and store said thumbnail version of the image of the check in the archive for seven years in lieu of storing the high resolution image of the check. A check is an example of a document that may be captured or processed in this invention. As used herein, a "check" may also refer to a myriad of financial documents, including but not limited to a lease document, a mortgage document, a deposit slip, a payment coupon, a receipt, or the like. In some embodiments, the check may exist as a physical item printed on paper or other medium. In other embodiments, the check may exist electronically.

Referring now to FIG. 1, FIG. 1 presents a general process flow 100, in accordance with some embodiments of the invention. At block 110, the method comprises receiving an image of a check. In some embodiments, the image of the check may be received by an apparatus (e.g. a computer system) via a user's mobile device, a camera, an Automated Teller Machine (ATM) at one of the entity's facilities, a second apparatus at a teller's station, or the like. In other embodiments, the apparatus may be configured to capture the image of the check. An example of an apparatus that performs block 110 is the user input system 240 in FIG. 2.

At block 120, the method comprises processing the image of the check to collect check information. After the successful retrieval or capture of the image of the check, the apparatus may process the image of the check. The apparatus may capture individual pieces of check information from the image of the check. In some embodiments, the check information may be text. In other embodiments, the check information may be an image. Further processing enables the apparatus to create a thumbnail version (a resized smaller version) of the image of the check at a lower resolution. In some embodiments, the thumbnail version of the image of the check may be created substantially simultaneously to the capture of the image of the check. An example of the apparatus that performs block 120 is system 230 in FIG. 2.

At block 130, the method comprises storing the check information. After the image of the check is processed, the apparatus may store the collected check information. In some embodiments, the individual pieces of check information may be stored separately, and may be associated with each other via data or metadata. In some embodiments, the individual pieces of check information may be stored together. In some embodiments, the apparatus may additionally store the original image of the check immediately after the image of the check is received. Because the original high resolution image of the check must be held in storage for a 90 day period, the high resolution image of the check may be deleted 90 days (or any time thereafter) following its capture. In some embodiments, the apparatus may additionally store the thumbnail version of the image of the check. The entity may reserve the right to determine how to process and/or how long to store the check information, image of the check, and/or the thumbnail version of the check. An example of the apparatus that performs block 130 is system 230 in FIG. 2.

At block 140, the method comprises generating a second image of the check, based on the check information. If the user wishes to view the image of the check, the apparatus may generate a second image of the check based on the stored check information (text, images, or the like). In some embodiments, pieces of the check information may be requested individually. In these embodiments, pieces of the check information may be delivered individually based on the user's request. For example, if the user wishes to view just the check number, the apparatus may deliver to the user just the check number, not the entire image of the check. In other embodiments, multiple pieces of the check information may be retrieved. For example, if the user wishes to view an image of the entire check, the apparatus may retrieve multiple pieces of check information and produce for the user an image of the check. In some embodiments, the generated image of the check may accurately present the stored check information on a standard template (e.g. a check with a blank or plain background). The entity may reserve the right to determine the design or style of the template.

Referring now to FIG. 2, FIG. 2 presents an exemplary block diagram of the system environment 200 for implementing the process flow described in FIG. 1 in accordance with embodiments of the present invention. As illustrated, the system environment 200 includes a network 210, a system 230, and a user input system 240. Also shown in FIG. 2 is a user 245 of the user input system 240. The user input system 240 may be a mobile device described herein. The user 245 may be a person who uses the user input system 240 to execute a user application 247. The user application 247 may be an application to communicate with the system 230, perform a transaction, input information onto a user interface presented on the user input system 240, or the like. The user application 247 and/or the system application 237 may incorporate one or more parts of any process flow described herein.

As shown in FIG. 2, the system 230, and the user input system 240 are each operatively and selectively connected to the network 210, which may include one or more separate networks. In addition, the network 210 may include a telecommunication network, local area network (LAN), a wide area network (WAN), and/or a global area network (GAN), such as the Internet. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a tablet computing device, a network device, an ATM, a bank teller's equipment, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein. Specifically, the user application 247 executes the process flow described in FIG. 1, as well as any other process flow described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information. Additionally, the user input system 240 may include a positioning system. The positioning system (e.g., a global positing system GPS) may enable at least one of the user input system 240 or an external server or computing device in communication with the user input system 240 to determine the location (e.g., location coordinates) of the user input system 240.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols. In some embodiments, the user application 247 may be associated with a mobile device, wherein the mobile device executes a check deposit application. In some embodiments, the user application 247 may be associated with an ATM at one of the entity's facilities. Thus, the ATM may include a check imaging system wherein the check imaging system captures an image of the check. Following successful capture of the image of the check, the ATM may transmit the image to the system 230 for processing, storage, generation of an image of the check, or the like. In other embodiments, the user application 247 may interact with a bank teller, his equipment, a kiosk in the entity's facility, or the like associated with the entity.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be a server managed by the entity. The system 230 may be located at the facility associated with the entity or remotely from the facility associated with the entity. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols. In some embodiments, the system application 237 may include the processing of the image of Check 1 300 from which the system 230 may collect check information.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein. For example, the datastore 238 may store information associated with the user's account, check information, or the like. Further, the datastore 238 may comprise an archive, temporary storage locations, or the like.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current. FIG. 4 expresses the datastore 238 and its contents in more detail.

FIG. 2 also shows two check images that interact with the system environment 200. The image of Check 1 300 may be the image of the check that is received by the user input system 240. The user input system 240 may collect the check information from the image of Check 1 300. The image of Check 2 500 may be the image of the check that is generated by the system 230. The image of Check 2 500 may be generated based on the check information stored in the datastore 238. Both images of Check 1 300 and Check 2 500 may include an image of the entire check, a thumbnail version of the image of the check, individual pieces of check information, or the like.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flows described and/or contemplated herein in connection any process flow described herein. Additionally, the system 230 or the user input system 240 is configured to initiate presentation of any of the user interfaces described herein. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. As used herein, an apparatus may refer to at least one of the user input system 240 or the system 230.

Now referring to FIG. 3, FIG. 3 illustrates an exemplary image of Check 1 300, the image of the check received by the user input system 240. The image of Check 1 300 may comprise an image of the entire check, a thumbnail version of the image of the check, individual pieces of check information, or the like. Check 1 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. The user input system 240 may capture an image of Check 1 300 and transmit the image to the system 230 via a network. The system 230 may collect the check information from the image of Check 1 300 and store the check information in the datastore 238. In some embodiments, the pieces of check information may be stored in the datastore 238 individually. In other embodiments, multiple pieces of check information may be stored in the datastore 238 together. In some embodiments, the pieces of check information may be stored in the datastore 238 immediately following the capture of the image of Check 1 300. In other embodiments, the pieces of check information may be stored in the datastore 238 at a predetermined point in time after the image of Check 1 300 has been captured. The entity may reserve the right to determine the point in time in which the check information is stored in the datastore 238. In some embodiments, the check information may be captured or stored in the datastore 238 at a lower resolution than the original image of the check. In other embodiments, the check information may be captured or stored in the datastore 238 at a higher resolution than the original image of the check. In some embodiments, the check information may be captured or stored in the datastore 238 at a reduced size. In other embodiments, the check information may be captured or stored in the datastore 238 at an increased size.

Now referring to FIG. 4, FIG. 4 illustrates an example of the datastore 238. The system 230 may store the pieces of check information of the processed check in one or more datastores 238. In some embodiments, a datastore 238 may comprise at least one element of check information for multiple checks. For example, a datastore 238 may include check numbers (or payee names, check amounts, check dates, signatures, or the like) for multiple checks. In other embodiments, multiple checks may share a single datastore 238 for the storage of their check information. Items 410, 420, 430, and 440 represent categories of check information in the datastore 238. For example, categories of check information may include but are not limited to the check number, the location of the check transaction, the payee, the amount of the check, the memo description, the contact information, the date, the signature, the account number and routing number, or the like. Further, associated pieces of check information for a single check may be linked with one another using data or metadata. For example, check number 0001 and payee name 0001 may be associated with each other for ease of access.

Referring now to FIG. 5, FIG. 5 illustrates the image of Check 2 500. The image of Check 2 500 comprises an image of the entire check, a thumbnail version of the image of the check, individual pieces of check information, or the like. The system 230 may retrieve the pieces of check information to generate a new image of Check 2 500. In some embodiments, the retrieved pieces of check information may be presented in the image of Check 2 500 at a lower resolution than the original image of the check. In other embodiments, the check information may be presented in the image of Check 2 500 at a higher resolution than the original image of the check. In some embodiments, the check information may be presented in the image of Check 2 500 at a reduced size. In other embodiments, the check information may be presented in the image of Check 2 500 at an increased size. Check 2 500 may comprise check information, wherein the check information may comprise contact information 505, the payee 510, the memo description 515, the account number and routing number 520 associated with the appropriate user or customer account, the date 525, the check number 530, the amount of the check 535, the signature 540, or the like.

FIG. 6 is a flow chart of a method 600 of retrieving check information from an archive based on location, in accordance with some embodiments of the invention. In some embodiments, the method includes determining a location of a check transaction; storing the location in an archive in association with the check transaction; determining a location of a user; determining a list of check transactions associated with the location of the user; and providing the list of check transactions to the user, as will be discussed in greater detail below. The method may also include providing offers or recommendations to the user based at least in part on the check transaction. In some embodiments, the method allows the user or the system to broaden or narrow the search results based on at least on characteristic of the transaction.

In block 602, the system determines a location associated with a check transaction. In some embodiments, the system determines the location based on data received over a network, such as a transaction processing network or wireless network. The data may be based on records affiliated with a financial institution. For example, the data may be received from the datastore 238 disclosed in FIG. 4. For example, a bank may have a record of the address of a specific business. The bank may determine that the check was presented at the business and associate the location of the business with the check transaction. The bank determines that the check was presented to the business based on a deposit of the check by the business. In a further embodiment, the merchant may confirm availability of funds for the check before accepting the check as payment. When the merchant confirms the availability, the system may associate the check with the business location. In a still further embodiment, the check is scanned by a device at the merchant or at an ATM and the location associated with the scan is recorded in association with the check transaction. In some embodiments, mobile devices may be used to conduct a check transaction. For example, a user may take a photo of a check and transmit the photo to a financial institution. The mobile device, which in some embodiments includes a geopositioning device, associates the location where the photo is taken as a location associated with the check transaction. In some embodiments, the address on the check or a notation on the memo line is used to determine the location of the check transaction.

In some embodiments, the data may be encrypted for security. In some embodiments, the data include financial account information or a proxy for financial account information. For example, the data may include the name and/or financial account number of a first party, e.g., a pay or, to the transaction and an account number and/or financial account number of a second party, e.g., a payee. The data may further include the amount of the transaction, the time and date of the transaction, a category of the transaction, or other information. In an exemplary embodiment, data associated with the transaction is captured and stored in the datastore. For example, an electronic receipt or e-receipt may be generated in response to a check transaction. The e-receipt may include the products that were purchased as part of the check transaction. In an embodiment, the e-receipt is stored in association with the check transaction and available to the user at a later date. The e-receipt may include various depths of information, such as high level information including store name, amount, date or the like, as well as more detailed depths, such as the products that were purchased, the discounts that were applied, or the specific method of payment (e.g., gift card or the like).

In block 604, the system stores the location in an archive in association with the check transaction. As discussed in FIG. 4, a datastore may comprise at least one element of check information for multiple checks. In an exemplary embodiment, the datastore in the archive includes the location associated with the check transaction in association with other check information related to the check transaction, e.g., amount, payor, payee, date, or the like.

As discussed, the archive 606 is operated by a second entity that is a different or separate entity from the first entity (e.g., the financial institution) that, in one embodiment of the invention, implements the system 600. In one embodiment, the archive 606 could be part of the system 600. In another embodiment, the archive 606 is a distinct entity from the system 600. In an exemplary embodiment, the archive 606 is connected to the system via a network.

In block 608, the system determines a location of a user. The user's location may be determined based on the user's mobile device, such as triangulating or proximity to cell phone towers, based on social network data, or based on internet search data. In some embodiments, the location of a point of sale device is provided in the data received regarding the transaction. For example, the transaction data may include the street address, the geographic coordinates from an onboard GPS unit associated with a mobile device, or an accelerometer associated with the mobile device. In another embodiment, the computer-implemented method determines the location in conjunction with the financial institution database or online databases, such as online mapping databases. In some embodiments, the location is determined to a high degree of precision, such as that provided by a GPS unit. In other embodiments, however, the location is provided at a more general level of detail. For example, a locale of the point-of-transaction device may be provided, wherein the locale is a mall, a shopping center, or other region defined by common characteristics. The location of the point-of-transaction device may be determined at varying levels of detail and still used to provide check information related to the general locale. For example, all businesses in a shopping mall may be considered as in the same locale and therefore check information related to all of the businesses may be provided.

In one embodiment, the user must opt in to being tracked by the system before the system will do so. In an embodiment, the system determines the location of the user based on triangulation. For example, a communication device associated with the mobile device may connect to at least one transmitter of a wireless signal. The processor determines the distance from the transmitter and triangulates the location of the user. Any type of wireless signal may be used. In one embodiment, GPS signals captured by the user's mobile device are used. In an exemplary embodiment, Wi-Fi signals are used to determine the location of the user. For example, the strength of the Wi-Fi signal may be used to determine the distance from a Wi-Fi transmitter. Alternatively, communication time between the Wi-Fi transmitter and the mobile device may also be calculated. When distance from at least three known locations is provided, algorithms to determine the location of a user are known.

In a further embodiment, the system determines the location of the user based on proximity to pre-set markers. In some embodiments, pre-set markers are established throughout a locale, e.g., a mall. In some embodiments, the pre-set markers are established in a regular pattern, such as a grid. In other embodiments, however, the pre-set markers are established in a non-regular pattern. The pre-set markers may be randomly placed throughout a locale or placed in key locations, such as at the front of every store in a general locale. Using pre-set markers, the mobile device is configured to determine the user's location based on the pre-set marker. The mobile device may identify the nearest pre-set marker or a plurality of pre-set markers to identify the user's location. The pre-set markers may emit a signal, such as from an RFID tag, an NFC-enabled chip, or other signal that can be detected by the mobile device.

In some embodiments, the system determines the location of the user based on the user's original location and velocity data associated with the user and/or the mobile device. For example, the system may track the user using GPS while the user is outside a building and receiving satellite signals. When the user enters the building, the system evaluates the current location of the user (e.g., the entry point) and tracks the user's velocity (speed and direction) to continually determine the user's location. In some embodiments, a sensor, such as an RFID or NFC sensor, detects the user's passage and thereby determines the user's initial location. The user may contact the sensor with the mobile device or the user may merely pass by the sensor and be identified. In an embodiment, a curtain or arch defines an opening to a building and senses all individuals that pass through the curtain. The sensor communicates with the user's mobile device and thereby determines the user's initial location. When the user's initial location is known, an accelerometer, magnetometer, or other device can be used to determine the user's velocity, i.e., speed and direction. By knowing the user's initial location and tracking the user's velocity based on the mobile device, the system can accurately determine the user's current location.

In block 610, the system determines a list of check transactions associated with the location of the user. When the system determines the location of the user, the system may evaluate the archive to determine transactions that were conducted at the same location. For example, the location data may be matched to the check information at the location. In a further embodiment, the location is based on the business name. For example, the system may determine the business on a location, e.g., based on GPS coordinates, and then identify check transactions in the archive that were conducted at the same business. In some embodiments, the search of the archive for matching check transactions is limited to the specific location, e.g., a geographic point in space. In other embodiments, the search of the archive for matching check transactions includes check transactions sharing a more general relationship to the user's current location. For example, the search may turn up all check transactions at the merchant including those in different geographic locations.

In another example, the search may turn up all check transactions within a merchant category, for example all home improvement stores. In some embodiments, merchant categories are determined by merchant category code. In a further embodiment, the system identifies check transactions within a related budget category. For example, the system may associate a budget category with a check transaction based on the merchant, based on input from the user (e.g., a notation in the memo line, or updating the budget category via an online checking register). When the user conducts a transaction at the business, the system determines the budget category for the current transaction and provides the user a list of check transactions in the related budget category, e.g., grocery or the like. In some embodiments, the system sets default budget categories for merchants and allows the user to modify the default budget categories.

In some embodiments, the user and/or the system broadens or narrows the search results. For example, the system may broaden the search results to include not only check transactions at the location but also check transactions at nearby, e.g., a predetermined radius, locations. The system may identify all check transactions conducted within a one mile radius of the location. The system may also broaden the search results to include not only check transactions but also credit card, debit card, or mobile device transactions. Similarly, a user may narrow or limit search results. For example, the user may limit search results to only those that were conducted within a predetermined time period. For example, the user may be interested in only those transactions that were conducted within the past year. Times, dates, amount or other characteristics of a check transaction may be used to limit the search results based on the user's location. In some embodiments, the user is able to filter the search results. As discussed, search results may be filtered by location, amount, date, merchant name, merchant category, budget category, e-receipt information, or the like.

In some embodiments, the system also determines additional information associated with the location or the check transaction. For example, the system may identify e-receipts associated with the location. An e-receipt is a document prepared as a record of a transaction and stored in electronic form. A business may wirelessly transfer or email the user a copy of the user's receipt, for example. Other information may be available to the system as well. For example, information regarding the user's most recent transactions at the location may be available. The system may provide the date of the most recent transaction, the amount of the recent transaction, or the like.

In some embodiments, the system provides the list and/or other information to the user. Once the system determines the list of check transactions associated with the location of the user, the system may provide this list to the user. In an exemplary embodiment, the system provides the list to the user via the user's mobile device. For example, the user may enter a business and desire to know a list of check transactions conducted at the business. The system determines the user's location, as discussed previously, determines check transactions associated with the location, as discussed previously, and provides the list of check transactions to the user via the user's mobile device. In some embodiments, a selectable list is provided such that the user may select one or more check transactions determine additional information regarding the transaction. In one embodiment, the system provides a thumbnail of the check or a reconstruction of the check to the user. In some embodiments, the system provides the list to the user via an email or other electronic message. In some embodiments, the list is provided to the user by being displayed on a touchscreen of a mobile device. In an exemplary embodiment, the user is able to change the level of detail provided to the user. For example, the user may be able to dynamically change the filters to increase, decrease, or change the results that are displayed. Similarly, the user may be able to change the level of detail that is provided relating to check transactions. For example, the user may prefer to see high level check transactions generally but request seeing detailed check transaction at a specific point. If the user would like to return a product at a business, the user may find it useful to view the e-receipt and identify the specific items purchased in an earlier check transaction at a later date.

In block 612, the system provides an offer to the user based at least in part on a check transaction at the location of the user. In some embodiments, the check information and/or location information is used to determine an offer for the user. For example, the system may direct the user to alternative payment methods when the system determines that the user continuously uses checks for a certain transaction. In one example, the system offers to establish a direct transfer between the accounts. For example, the system may determine that a user always pays rent using a check. The system may offer to establish a regular transfer between two accounts so that the user does not need to write checks in the future. In another example, the system may direct the user to a method of paying with a mobile device so that the user does not need to carry checks in the future. In some embodiments, the system may provide an offer to the user disclosing a discount or other advantage when making the purchase in another way. For example, the system may advise the user that an extended warranty is available if the user conducted the transaction with a credit card.

FIG. 7 illustrates an embodiment of a mobile device 700 that may be configured to operate in coordination with the disclosed system and method. In an embodiment, a "mobile device" 700 is any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, or the like.

The device 700 may generally include a processor 710 communicably coupled to such components as a memory 720, user output devices 736, user input devices 740, a network interface 760, a power source 715, a clock or other timer 750, a camera 770, at least one positioning system device 775, one or more check identification systems 790, and the like. The processor 710, and other processors described herein, may generally include circuitry for implementing communication and/or logic functions of the device 700. For example, the processor 710 may include a digital signal processor device, a microprocessor device, and various analog to digital converters, digital to analog converters, and/or other support circuits. Control and signal processing functions of the device 700 may be allocated between these devices according to their respective capabilities. The processor 710 thus may also include the functionality to encode and interleave messages and data prior to modulation and transmission. The processor 710 may additionally include an internal data modem. Further, the processor 710 may include functionality to operate one or more software programs or applications, which may be stored in the memory 720. For example, the processor 710 may be capable of operating a connectivity program, such as a web browser application 722 or email application 724. The web browser application 722 may then allow the device 700 to transmit and receive web content, such as, for example, location-based content and/or other web page content, according to a Wireless Application Protocol (WAP), Hypertext Transfer Protocol (HTTP), and/or the like.

In some embodiments, the positioning system device 775 is configured to determine the location of the device. For example, at least one of the positioning system devices 775 may interact with the transceiver to send and/or receive information with wireless transmitters, such as GPS or Wi-Fi. In further embodiments, the positioning system device 775 is configured to determine movement and/or orientation of the mobile device. Accelerometers, magnetometers, and other devices can be included in the mobile device to provide information to the device on the location and velocity (speed and direction) of the device. Other types of positioning system devices 775 may be included in the device without limitation. For example, altimeters can be included in the device to determine the elevation of the device. Similarly, electronic or standard compasses may be included.

The processor 710 may also be capable of operating applications, such as a check identification application 721. The check identification application 721 may be downloaded from a server and stored in the memory 720 of the device 700. Alternatively, the check identification application 721 may be pre-installed and stored in a memory of the check identification system 790 or activated directly from a website operably linked to the device 700 through the network interface 760. In embodiments where the check identification application 721 is pre-installed or run from a website, the user may not download the check identification application 721 from a server. The check identification system 790 may also include a user data storage 771 which may permanently or temporarily store data relating to the user in a local memory on the device 700. The check identification system 790 and application 721 are configured to conduct the steps of the system and method disclosed in FIG. 6. In some embodiments, the device 700 includes a network interface 760 comprising transmitters 774 and receivers 772 for communicating over a network. In an embodiment, the network interface 760 includes an archive interface 773 to communicate over a network with the archive.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for retrieving check information based on location, the system comprising:
    a computer apparatus including a processor and a memory; and
    a software module stored in the memory, comprising executable instructions that when executed by the processor cause the processor to:
        determine a location of a check transaction, the check transaction comprising one or more characteristics of the transaction;
        store the location in an archive in association with the characteristics of the check transaction;
        determine a location of a user;
        determine a list of check transactions associated with the location of the user stored in the archive;
        receive filter criteria comprising limitations related to characteristics of check transactions from the user, wherein the limitation is based on a characteristic of the transaction selected from the group consisting of a location, an amount, a date, and a category;
        apply the filter criteria to the list of check transactions; and
        provide the filtered list of check transactions to the user.

2. The system of claim 1, wherein the module is further configured to provide an offer to the user based at least in part on a check transaction at the location of the user.

3. The system of claim 2, wherein the offer is an offer to establish an alternative payment method for the check transaction.

4. The system of claim 2, wherein the offer is an offer for a benefit when the user uses an alternative payment method for the check transaction.

5. The system of claim 1, wherein the location of the user is determined using a positioning system device.

6. The system of claim 1, wherein storing the location in the archive with the check transaction comprises extracting check information from the check and storing the check information in a database.

7. The system of claim 1, wherein the location of the check transaction is determined based on an address of the recipient of the check.

8. A computer program product retrieving check information based on location, the computer program product comprising:
    a non-transitory computer readable storage medium having computer readable program code embodied therewith, the computer readable program code comprising:
    a computer readable program code configured to determine a location of a check transaction, the check transaction comprising one or more characteristics of the transaction;
    a computer readable program code configured to store the location in an archive in association with the characteristics of the check transaction;
    a computer readable program code configured to determine a location of a user;
    a computer readable program code configured to determine a list of check transactions associated with the location of the user stored in the archive;
    a computer readable program code configured to receive filter criteria comprising limitations related to characteristics of check transactions from the user, wherein the limitation is based on a characteristic of the transaction selected from the group consisting of a location, an amount, a date, and a category;
    a computer readable program code configured to apply the filter criteria to the list of check transactions; and
    a computer readable program code configured to provide the filtered list of check transactions to the user.

9. The computer program product of claim 8, the computer program product further comprising a computer readable program code configured to provide an offer to the user based at least in part on a check transaction at the location of the user.

10. The computer program product of claim 9, wherein the offer is an offer to establish an alternative payment method for the check transaction.

11. The computer program product of claim 9, wherein the offer is an offer for a benefit when the user uses an alternative payment method for the check transaction.

12. The computer program product of claim 8, wherein the location of the user is determined using a positioning system device.

13. The computer program product of claim 8, wherein storing the location in the archive with the check transaction comprises extracting check information from the check and storing the check information in a database.

14. The computer program product of claim 8, wherein the location of the check transaction is determined based on an address of the recipient of the check.

15. A method for retrieving check information based on location, the method comprising:

using a computer processor comprising computer program code instructions stored in a non-transitory computer readable medium, wherein said computer program code instructions are structured to cause said computer processor to:

determine a location of a check transaction, the check transaction comprising one or more characteristics of the transaction;

store the location in an archive in association with the characteristics of the check transaction;

determine a location of a user;

determine a list of check transactions associated with the location of the user stored in the archive;

receive filter criteria comprising limitations related to characteristics of check transactions from the user, wherein the limitation is based on a characteristic of the transaction selected from the group consisting of a location, an amount, a date, and a category;

apply the filter criteria to the list of check transactions; and provide the filtered list of check transactions to the user.

16. The method of claim 15, the method further comprising providing an offer to the user based at least in part on a check transaction at the location of the user.

17. The method of claim 16, wherein the offer is an offer to establish an alternative payment method for the check transaction.

18. The method of claim 16, wherein the offer is an offer for a benefit when the user uses an alternative payment method for the check transaction.

\* \* \* \* \*